United States Patent
Kawatani

(10) Patent No.: US 7,499,923 B2
(45) Date of Patent: Mar. 3, 2009

(54) DOCUMENT CLUSTERING METHOD AND APPARATUS BASED ON COMMON INFORMATION OF DOCUMENTS

(75) Inventor: Takahiko Kawatani, Yokohama (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 668 days.

(21) Appl. No.: 10/791,897

(22) Filed: Mar. 4, 2004

(65) Prior Publication Data

US 2004/0230577 A1 Nov. 18, 2004

(30) Foreign Application Priority Data

Mar. 5, 2003 (JP) ............... 2003-105867
Feb. 6, 2004 (JP) ............... 2004-030629

(51) Int. Cl.
G06F 7/00 (2006.01)
G06F 17/30 (2006.01)
G06F 17/28 (2006.01)
G06F 17/27 (2006.01)

(52) U.S. Cl. .................... 707/7; 704/1; 704/9
(58) Field of Classification Search ............... None
See application file for complete search history.

(56) References Cited

U.S. PATENT DOCUMENTS

| | | | |
|---|---|---|---|
| 5,675,819 A | 10/1997 | Schuetze | |
| 5,787,422 A * | 7/1998 | Tukey et al. | 707/5 |
| 6,356,864 B1 | 3/2002 | Foltz et al. | |
| 6,360,227 B1 | 3/2002 | Aggarwal | |
| 7,130,848 B2 * | 10/2006 | Oosta | 707/5 |
| 7,225,184 B2 * | 5/2007 | Carrasco et al. | 707/3 |
| 2003/0028558 A1 * | 2/2003 | Kawatani | 707/500 |
| 2004/0064438 A1 * | 4/2004 | Kostoff | 707/1 |
| 2004/0093557 A1 * | 5/2004 | Kawatani | 715/500 |
| 2005/0022106 A1 * | 1/2005 | Kawai et al. | 715/500 |

OTHER PUBLICATIONS

Jain A K et al: "Data clustering: a review" ACM Computing Surveys, ACM, New York, NY, US, vol. 31, No. 3, Sep. 1999, pp. 264-323.
Manning et al., *Foundations of Statistical Natural Language Processing*, Chapter 14, pp. 495-528, 1999, The MIT Press.
Liu et al., "Document Clustering with Cluster Refinement and Model Selection Capabilities," *Proceedings of the 25th Annual International ACM-SIGIR Conference on Research and Development in Information Retrival*, Aug. 2002, pp. 191-198, Tampere, Finland.

* cited by examiner

*Primary Examiner*—Luke S. Wassum
*Assistant Examiner*—Michael Pham

(57) ABSTRACT

In document (or pattern) clustering, the correct number of clusters and accurate assignment of each document (or pattern) to the correct cluster are attained. Documents (or patterns) describing the same topic (or object) are grouped, so a document (or pattern) group belonging to the same cluster has some commonality. Each topic (or object) has distinctive terms (or object features) or term (or object feature) pairs. When the closeness of each document (or pattern) to a given cluster is obtained, common information about the given cluster is extracted and used while the influence of terms (or object features) or term (or object feature) pairs not distinctive to the given cluster is excluded.

9 Claims, 4 Drawing Sheets

DOCUMENT CLUSTERING METHOD AND APPARATUS BASED ON COMMON INFORMATION OF DOCUMENTS

BACKGROUND OF THIS INVENTION

1. Field of this Invention

The present invention relates to processing including document and pattern clustering.

2. Description of the Related Art

Document and pattern clustering are techniques for dividing an inputted document or pattern set into some groups according to the content or topics of documents or patterns. The clustering technique has been studied for a long time, and methods hitherto devised are systematically introduced in "Foundations of Statistical Natural Language Processing" (The MIT Press, 1999) written by C. D. Manning and H. Schutze. There are two clustering approaches. One, termed soft clustering, obtains the probability that each document or pattern belongs to each cluster. The other, termed hard clustering, determines whether or not each document or pattern belongs to each cluster. Hard clustering is further divided into hierarchical and non-hierarchical approaches. The hierarchical approach is further divided into bottom-up and top-down approaches. In the initial state of the hierarchical approach, each document or pattern becomes a seed of a cluster, and processing by merging the closest clusters is repeated. To merge the closest cluster, a document or pattern set is expressed in a tree structure. Known methods of measuring the degree of closeness (i.e., similarity) between clusters are the single link method, the complete link method, and the group average method. In each of these measurement methods, a calculation is performed based on the similarity between two documents or patterns. In the top down approach, from an initial state where all documents or patterns are in one cluster, processing is repeated. For example, if the lowest similarity in all document or pattern pairs in one cluster is less than a threshold value, the cluster is divided.

In the non-hierarchical method, a previously determined number of clusters are constructed to satisfy some standard. Typical processing steps in the non-hierarchical method are:

step 1: randomly select a specified number of clustered documents or patterns and make them the centers of the respective clusters, step 2: determine the distance between each document or pattern and the center of each cluster and make each document or pattern belong to the cluster closest to it, step 3: determining the center of each cluster by averaging document or pattern vectors belonging to each cluster, and step 4: perform the processing of step 2; if the cluster to which each document or pattern belongs has not changed, end the procedure; and if there has been a change, perform, step 3.

The conventional document and pattern clustering techniques have three serious problems. One problem is about the number of clusters to be obtained. In document or pattern clustering, the number of clusters to be obtained must be the same as the number of topics stated in the documents or patterns of an inputted document or pattern set. As described above, in the bottom-up hierarchical clustering processing, each cluster starts from a state including one document or pattern, merging the closest clusters is repeated until all documents or patterns are finally in one cluster. Accordingly, in order to obtain clusters whose number is same as the number of topics, it is necessary to stop cluster merging. This can be realized by not merging cluster pairs having a similarity lower than a threshold value. However, it is difficult to determine the threshold value. If the threshold value is inadequate, the correct number of clusters can not be obtained. Similarly, in top-down clustering processing, if a cluster is not divided in the case where the lowest similarity in all document or pattern pairs in one cluster is higher than a threshold value, the same number of clusters as the number of topics should, in principle, be obtained.

In this case, it is also difficult to determine the threshold value. Besides, in non-hierarchical clustering, the user is required to input (in advance) the number of clusters into which a given document set is divided. However, it is impossible to accurately input the information about the number of clusters without previous knowledge of the input document or pattern set. As stated above, it is a difficult problem to obtain the correct number of clusters from the input document or pattern set. Although performance has been improved by Liu et al's attempt to correctly infer the number of clusters in non-hierarchical clustering, it is not perfect (X. Liu, Y. Gong, W. Xu and S. Zhu, Document Clustering with Cluster Refinement and Model Selection Capabilities; Proceedings of the 25th Annual International ACM-SIGIR Conference on Research and Development in Information Retrieval, pp. 191-198. Tampere, Finland, August, 2002).

The second problem is clustering accuracy. This is a problem as to whether documents or patterns belonging to the same cluster describe the same topic or object. In clustering processing, in general, a document is expressed by a vector. Each vector component depends on the presence of each term in the document or the term occurrence frequency. The similarity between two clusters is determined on the basis of (1) the cosine similarity between two vectors of documents belonging to different clusters, and (2) the distance between a certain document and a cluster. The distance the document or pattern and cluster is determined by the distance (for example, Euclidean distance) between the vector of the document or pattern and the average vector of documents or patterns in the cluster. In conventional clustering processing, when the cosine similarity or the Euclidean distance is obtained, a vector obtained for each document or pattern is usually used without verifying what term is important for the cluster. Thus, the existence of a term or object feature or a term or object feature pair which is not essential to each cluster can have an influence on the accuracy of the clustering.

The third problem is how to extract the hierarchy of a topic or object. Usually, there is a hierarch in a topic or object. For example, consider the topic "Iraq war". A subtopic in related news articles may be any one of; "Iraq war", "Saddam Hussein", "Inspection of weapons of mass destruction by United Nations", "Opinion of President Bush" or "Opposition of France, Germany and Russia." Consider the case of clustering results of such news articles. A user who wants to know about "Iraq war" would want to be shown document groups corresponding to each subtopic obtained by sub-clustering; the user would usually not want to be shown the original clustering results. Since it is difficult to exactly determine clusters corresponding to individual topics and to assign each document to a correct cluster as mentioned above, sub-clustering remains a difficult problem.

SUMMARY OF THE INVENTION

We consider the case of flat clustering where the topic (or object) hierarchy is not obtained. Since document (or pattern) clustering groups documents (or patterns) according to a topic (or object) described in each document (or pattern), documents (or patterns) (called cluster document (or pattern) set) belonging to one cluster ought to describe the same topic (or object). Accordingly, the cluster document set ought to have some commonality. Besides, each topic (or object) ought to have terms or term pairs distinctive to the topic (or object), and which frequently occur in the topic (or object), but seldom occur in other topics (or objects) Accordingly, there ought to be differences in occurrence tendencies of terms or term pairs (or objects or object pairs) among clusters.

In view of the above, according to one aspect of this invention, in order to increase the accuracy of the clustering, the following are introduced in a clustering process.

A) Common information of a given cluster document (or pattern) set is extracted, and closeness (document (or pattern) commonality) of each document (or pattern) to the given cluster is obtained using common information.

B) Terms and term pairs (or object features or object feature pairs) not distinctive to the given cluster are detected, and the influence of those pairs that are not distinctive is removed in the calculation of the document commonality.

In conventional hierarchical processing, merging or dividing of clusters is repeated many times. In conventional non-hierarchical processing, members of clusters are interchanged many times. Hence, in the prior art it is difficult to detect common information of the respective clusters, or terms and term pairs (or object features or object feature pairs) not distinctive to the clusters.

An aspect of this invention employs a method including several steps, as follows.

Step 1: Candidates of a cluster seed are detected in a first iteration from all documents (or patterns). In second or subsequent iteration the cluster seed candidates are detected from documents (or patterns) having document (or pattern) commonalities to any current clusters that are less than a threshold.

Step 2: The similarities to all documents (or patterns), with respect to each candidate, are detected. Documents (or patterns) having similarities higher than a threshold are extracted as neighbor documents (or patterns). The candidate document (or pattern) having the greatest number of neighbor documents (or patterns) is selected as the seed of the cluster. The cluster is constructed from the set of the documents (or patterns) that are neighbors of the seed.

Step 3: The document (or pattern) commonality of each document (or pattern) to current clusters is detected. Documents (or patterns) having document (or pattern) commonalities higher than a threshold are made to temporarily belong to the cluster, so that the cluster grows. If the number of documents (or pattern) temporarily belonging to the cluster becomes constant, the procedure proceeds to step 4. If not, document (or pattern) commonality of each document (or pattern) to current clusters is again detected. If a termination condition is satisfied, the process proceeds to the next step. If not, the process returns to step 1 and continues.

Step 5: In the next step, document (or pattern) commonality (with respect to each document (or pattern)) to each cluster is detected, and each document (or pattern) is judged to belong to a cluster having a document (or pattern) commonality higher than a threshold.

Next a determination is made as to whether two or more clusters overlap and correspond to one topic (or object). Such a cluster is deleted as a redundant cluster, and a cluster to which each document (or pattern) belongs is again obtained for consideration.

In the above clustering procedure, a calculation of document (or pattern) commonality using the common information, and detection of a term or term pair (or object or object pair) not distinctive to a given cluster are carried out in steps 3 and 5. With respect to the former, the common information is extracted from the document (or pattern) temporarily belonging to the given cluster. With respect to the extraction and use of the common information, the method disclosed in Japanese Patent Application No. 2002-326157 can be adopted.

The basic idea can be understood by assuming that a given cluster is composed of R documents, and a sentence group composed of R sentences is constructed by extracting one sentence from the respective documents. The sentence groups are constructed for all possible combinations of sentences. The total number of such sentence groups becomes equal to the product of the numbers of the sentences of the respective documents. In a given sentence group, a term occurring in more than A sentences among the R sentences is defined as a common term, and a sentence constructed from the common terms is called a common sentence. Terms appearing in more than A documents become the common terms in some sentence groups. Also, assume that common sentences are constructed for all the sentence groups, and that a set of the common sentences is constructed. The set of the common sentences as stated above can be considered to represent the content of the common topic of the given cluster. Accordingly, if similarity between each document and the common sentence set can be obtained as the document commonality, it will represent the closeness of each document to the common topic of the given cluster.

The similarity between a document (or pattern) and a set of the common sentences (or groups of objects) has a non-zero value only when the document (or pattern) includes terms (or objects) appearing in more than A documents (or patterns). Consider two values, $A_1$ and $A_2$ ($A_1 > A_2$), as the value of A. Since the number of terms (or objects) appearing in more than $A_1$ documents (or patterns) is smaller than that appearing in more than $A_2$ documents (or pattern), the topic of the common sentences (or groups of objects) when $A=A_1$ is narrower than that when $A=A_2$. Therefore, the topic spread of documents (or patterns) having similarities more than a threshold to the common sentence (or group of objects) set is smaller when $A=A_1$ than when $A=A_2$. Furthermore, the number of documents (or patterns) which includes terms appearing in more than $A_1$ documents (or patterns) is smaller than the number when $A=A_2$. If the similarity between a document (or pattern) and a set of the common sentences (or groups of objects) is adopted as the document (or pattern) commonality in steps 3 and 5, the cluster is composed of documents (or patterns) having a wide spread topic when A is set at a small value, and vice versa. Thus, the value of A controls the topic (or object) spread of a cluster.

Terms and term pairs (or objects and object pairs) which are not distinctive to the given cluster are detected by considering the growth process of a given cluster whose seed document (or pattern) has topic (or object) i. To understand this concept, assume that (1) the number of documents describing topic i is $c_0$ in the whole document set, (2) c is a document set of the given cluster, (3) the number of documents including a term m is $U^0_{mm}$ in the whole input document set, (4) $U_{mm}$ is the document set of the given cluster, and (5) the term m is distinctive for topic i. Since most documents having the term m have topic i, the following relationship should be satisfied:
$U^0_{mm}/U_{mm} \sim c_0/c$ If the relationship $U^0_{mm}/U_{mm} \sim c_0/c$ is not satisfied as a result of the term m occurring frequently in documents having topics other than topic i, the following relationship should be satisfied:

$$U^0_{mm}/U_{mm} > c_0/c$$

Accordingly, if $c_0/c$ can be accurately determined, a determination can be made as to whether or not term m is distinctive to topic (or object) i. $U^0{}_{mm}/U_{mm}$ is called a document (or pattern) frequency ratio of term (or object feature) m. Among a specific number of terms (or object features) having the highest frequencies in a document (or pattern) set of a given cluster, (1) a specific number of terms (or object features) having small document (or pattern) frequency ratios are assumed to be distinctive to topic (or object) i, and (2) the average c' of the document (or pattern) frequency ratios of these terms (or object features) is regarded as the predicted value of $c_0/c$. Eventually, by using a constant coefficient α, a determination can be made that term (or object feature) m satisfying the following equation is not distinctive to topic (or object) i.

$$U^0{}_{mm}/U_{mm} > \alpha c'$$

Similarly, assume that the number of documents (or patterns) including terms (or object features) m, n is $U^0{}_{mn}$ in the whole input document (or pattern) set, and $U_{mn}$ is the document (or pattern) set of the given cluster. By using these assumptions, a determination can be made that term (or object feature) pair m, n satisfying the following equation is not distinctive to topic (or object) i.

$$U^0{}_{mn}/U_{mn} > \alpha c'$$

With respect to document commonality, to reduce the influence of the terms (or object feature) and the term (or object features) pairs not essential to a given cluster, the term (or object feature) and the term pair (or object feature) judged not to be distinctive to topic (or object) i are not used for the calculation of the document (or pattern) commonality between each document (or pattern) and the document (or pattern) set of the given cluster. Alternatively, $$c'/(U^0{}_{mm}/U_{mm})$$

$$c'/(U^0{}_{mn}/U_{mn})$$

can be used as weights for term (or object feature) m and term (or object feature) pair m, n respectively in calculating document (or pattern) commonality. By using this approach, document commonality has a large value for the document (or pattern) describing topic (or object) i. As a result, improved accuracy of the clustering can be expected.

In the whole clustering procedure, processing is repeatedly carried out so that initially, one document (or pattern) is extracted as a seed of a cluster, and then the seed grows by detecting and merging the documents (or patterns) describing the same topic (or object) as the seed. Accordingly, if the number of seed documents (or patterns) is the same as the number of topics (or objects) in the input document, the correct number of clusters can be obtained. Even if two seed documents (or patterns) are detected for the same topic (or object) as a result of step 1, since the redundant cluster is detected and removed at step 6, the correct number of clusters can be obtained. If a seed document (or pattern) is not detected for some topic (or object) as a result of step 1, the number of clusters becomes short. Such a situation occurs when documents (or patterns) having the topic (or object) to be detected have high document (or pattern) similarities to an existing cluster of other topics (or objects) and are merged to the cluster. However, since the accuracy of the clustering increases by adopting A) and B), the possibility of the documents (or patterns) having a different topic (or object) are mixed is low, a situation rarely occurs in which the number of obtained clusters becomes short.

Hierarchical clustering can be conducted by recursively applying the clustering procedure mentioned above as the value of A is varied or as terms (or object features) or term-pairs (or object feature pairs) are selectively used. Assume that: (1) the input document (or pattern) set is on the zero-th layer, (2) clusters obtained by applying clustering to the input document (or pattern) are on the first layer, (3) subclusters obtained by applying subclustering to each cluster on the first layer are on the second layer and (4) so on for subclustering for each cluster on subsequent layers.

Hierarchical clustering can be performed as follows. First, the clusters on the first layer are obtained by applying the clustering processing mentioned above by setting A at a proper value. The documents (or patterns) in each cluster has each topic (or object). When the subclusters on the second layer are obtained, A is set at a larger value than the value when the clusters on the first layer are obtained. The cluster on the first layer is partitioned into subclusters with subtopics (or sub-objects) having narrow spreads.

An alternative hierarchical clustering method is as follows. Distinctive terms (or object features) or term-pairs (object feature pairs) in the subclusters on the second layer must be terms (or object features) or term-pairs (or object feature pairs) with low document frequencies in a parent cluster on the first layer. The effective subclusters, therefore, are obtained by applying the clustering processing after terms (or object features) or term-pairs (or object feature pairs) with document (or pattern) frequencies higher than a threshold are eliminated. Similarly, subclusters on the third or the higher layer will be obtained.

DETAILED DESCRIPTION OF THE DRAWING

Figure 1:
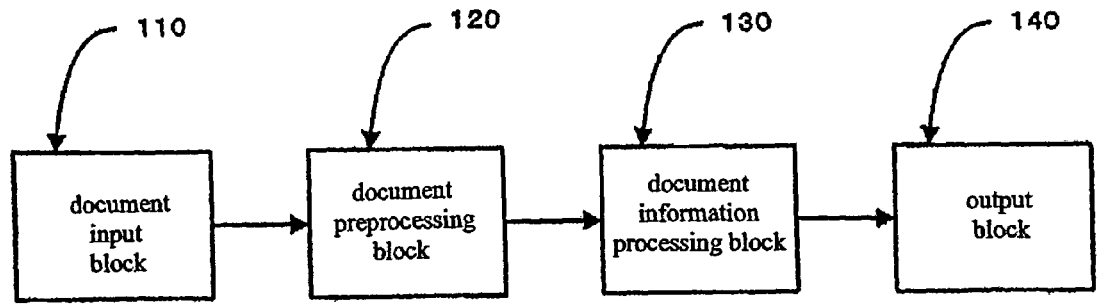
FIG. 1 is a block diagram of general computer operations associated with the invention.

FIG. 1 is a block diagram of a computer system for a method of performing natural language processing clustered documents. It is to be understood that the described principles are also applicable to pattern processing, but that the specific embodiment is described only in connection with document processing. The system includes document input block 110, document preprocessing block 120, document information processing block 130, and output block 140. A document set to be processed is inputted to the document input block 110. Document preprocessing block 120 performs, on an inputted document, term detection, morphological analysis, and document segment division.

The basic unit of a document segment of a document is a sentence. The beginning and end of a sentence of most European languages is easily detected because each sentence ends with a period, and when printed followed by a double space. As another document segmentation method, associated with complex sentences, the sentence is segmented (i.e., divided)

into a principle clause and a subordinate clause. In a further method, plural sentences are collected into a document segment so that the number of terms in each segment is about the same. A further method divides a document into segments having the same number of terms, from the beginning of the document, irrespective of the sentences in the document.

Block 130 performs information processing of the inputted document and processing directly related to clustering in the inputted document. Block 130 performs operations such as (1) detecting a seed document, (2) calculating document set commonalities between all inputted documents and a given cluster, and (3) detecting terms and term pairs not distinctive to a particular cluster. Block 130 is described in detail later. Output block 140 outputs, to an output device such as display, the result obtained by document information processing block 130.

Figure 2A:
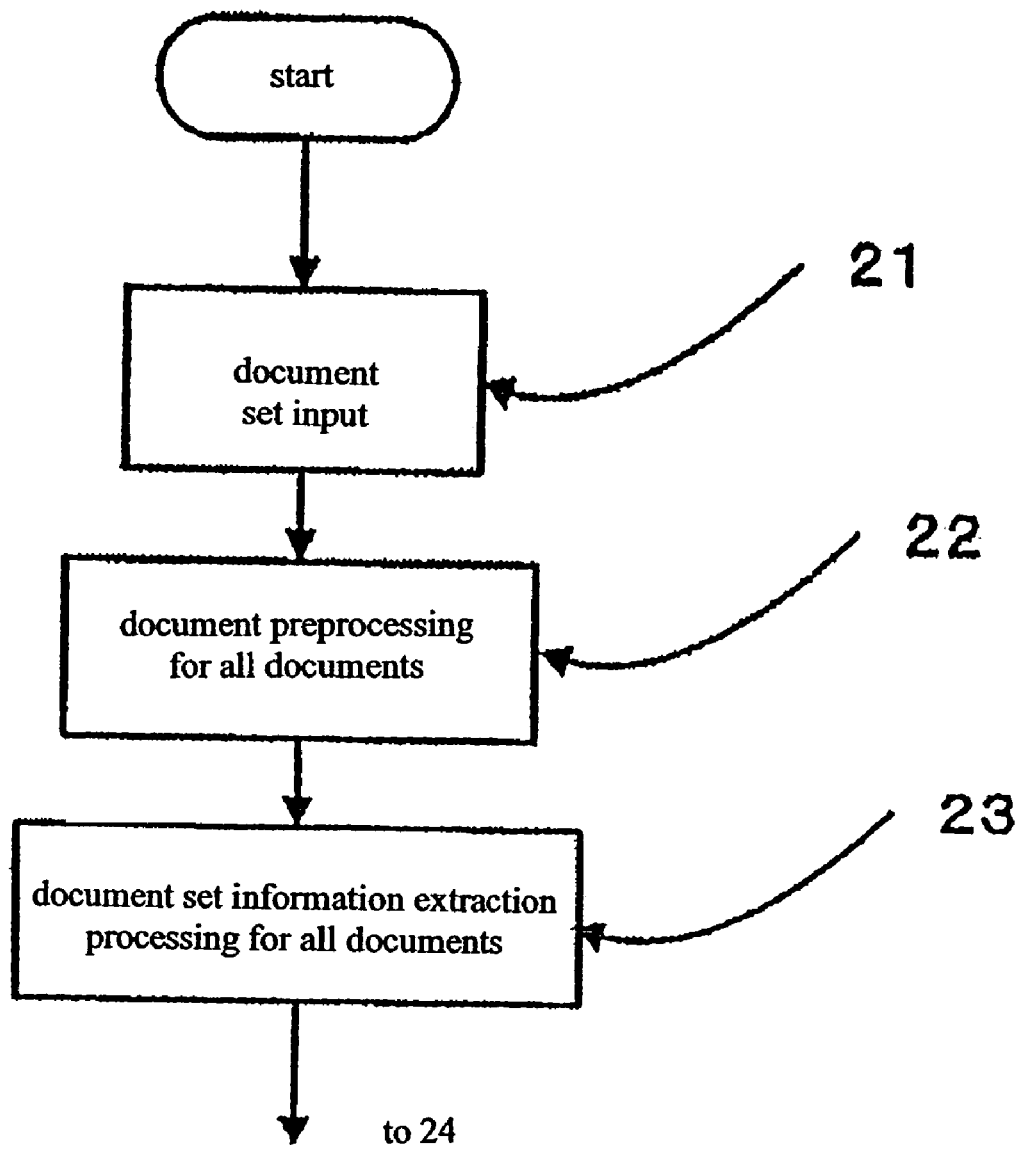
FIGS. 2A and 2B is a flow diagram of operations associated with a document input and preprocessing blocks of FIG. 1, for determining a procedure from the stage where a document set is inputted to the stage of determination clusters to which each document belongs.
Figure 2B:
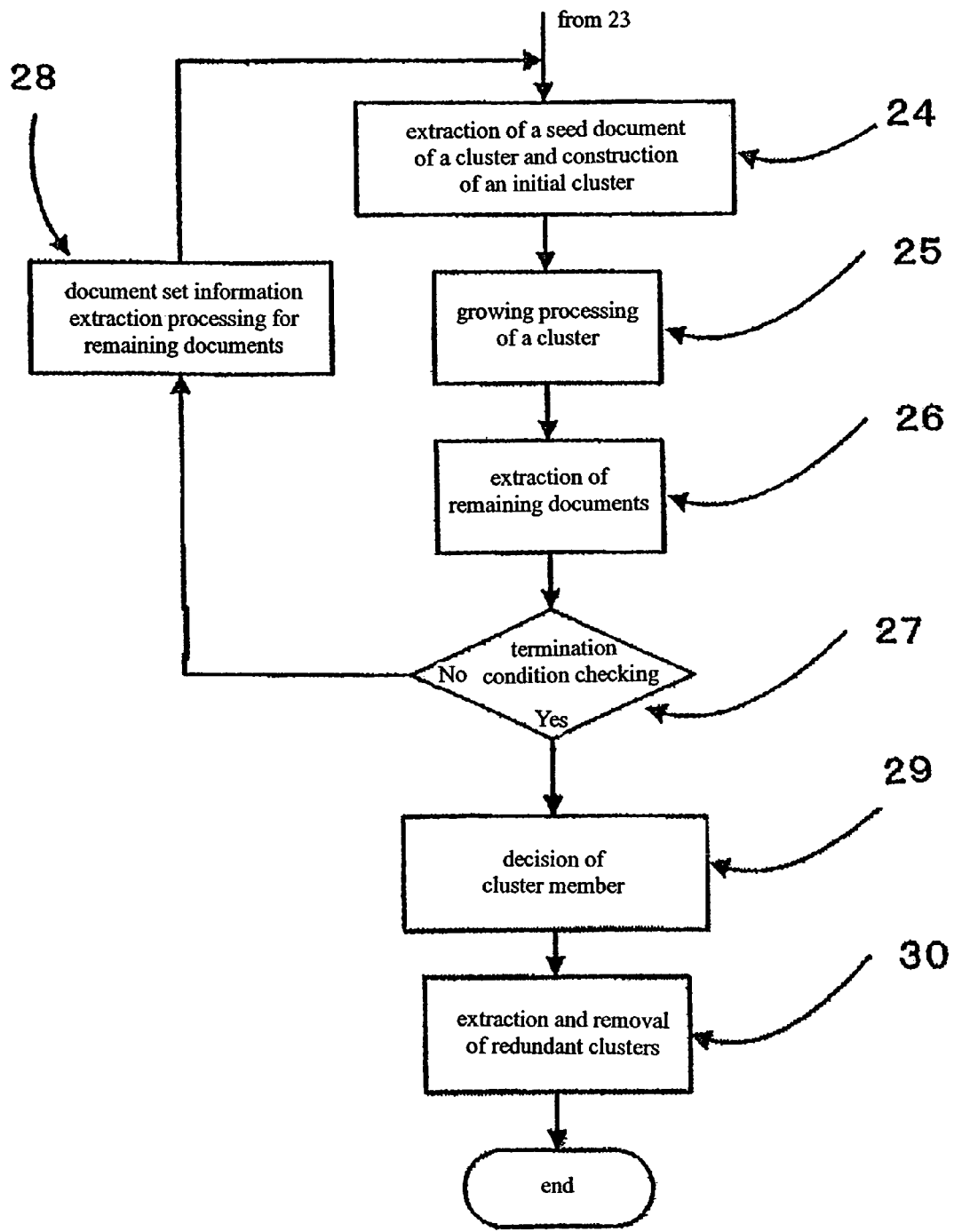

FIGS. 2A and 2B constitute a flow diagram of clustering and other operations that blocks 110, 120 and 130 perform on a given document set. The operations of FIGS. 2A-2B and 3 can be carried out by running a program on a general-purpose computer.

During step 21 a document set is supplied to the computer by input block 110. The supplied documents are all pre-processed in pre-processing block 120 during step 22. During step 23 block 130 extracts information from all the documents in the document set. During step 24 block 130 extracts a seed document of a cluster and constructs an initial cluster. Block 130, during step 25, processes a document to grow a cluster. During step 26 block 130 extracts the remaining documents in the set. Block 130, during step 27, terminates condition checking. During step 28, block 130 processes the document set to extract information from the remaining documents. Block 130, during steps 29 and 30, decides what is in a cluster member, and then extracts and removes redundant clusters, respectively. An embodiment is described in which an English language document is processed.

First, a document set is inputted to the computer as an object during step 21. When subclusters on the n-th layer are obtained in hierarchical clustering, the input document set is composed of documents in a (sub)cluster on the (n−1)th layer. In the document preprocessing step 22, document preprocessing (such as term detection, morphological analysis, document segment dividing, and document segment vector construction) are performed for each input document. Term detection involves detecting words, numerical expressions, symbol series, and the like for each input document. Hence, a word, numerical expression a symbol series and the like are generically called a term. Since the English language writing notation method has spaced apart terms, term detection is easily performed.

Next, morphological analysis (such as part of speech tagging to terms) is performed for each input document.

Document segmentation (or dividing) is performed for each input document. In document segment vector construction, the dimensions of a vector to be constructed and the correspondence between each component and each term are initially determined from terms occurring in the whole document. It is not necessary to make components of the vector correspond to all terms occurring in the document. By using the result from part of speech tagging, the vector can be constructed by using, for example, only terms judged to be nouns and verbs. Next, the document segment vector is constructed so only components corresponding to terms occurring in each document segment are 1, and the others are 0.

In the document set information extraction step 23 for all documents, data used in the clustering processing stage are obtained from each document and the whole input document set. The data to be obtained are a co-occurrence matrix of each document, a co-occurrence matrix (common co-occurrence matrix) of the document set, and a document frequency matrix of the whole input document set. The co-occurrence matrix of each document is a matrix reflecting the occurrence frequencies of terms, and the co-occurrence frequencies of term pairs.

The description continues for the case of a sentence being a document segment, by letting: M denote the number of kinds of the occurring terms, $D_r$ denote the r-th document in a document set D consisting of R documents, $Y_r$ denote the number of sentences in document $D_r$, and $d_{ry}=(d_{ry1}, \ldots, d_{ryM})^T$ denote a y-th sentence vector. Since the sentence vector $d_{ry}$ is a binary vector, $d_{rym}$ denotes the existence or absence of the m-th term. $S^r$, the co-occurrence matrix of the document $D_r$, is given by $$S^r = \sum_{y=1}^{Y_r} d_{ry} d_{ry}^T, \qquad (1)$$

where T denotes vector transpose.

From equation (1), the mn components of $S^r$ are given by $$S^r_{mn} = \sum_{y=1}^{Y_r} d_{rym} d_{ryn}.$$

Therefore, $S^r_{mm}$ represents the number of sentences in which term m occur and $S^r_{mn}$ represents the co-occurrence counts of sentences in which terms m and n co-occur. If each term does not occur twice or more in each sentence, $S^r_{mm}$ represents the occurrence frequency of term m in document $D_r$. Next, the system obtains matrix T, whose mn component is defined as $$T_{mn} = \prod_{r=1}^{R} S^r_{mn}$$

$$S^r_{mn} > 0$$

Further, a document frequency matrix $U^0$ that stores the document frequencies of each term and each term in the input document set is obtained. Matrices $U^0_{mm}$ and $U^0_{mn}$ respectively denote the number of documents in which the term m occurs, and the number of documents in which the terms m and n co-occur. By using the matrices T and $U^0$ as stated above, a common co-occurrence matrix $T^A$ is obtained. The mn component of the common co-occurrence matrix $T^A$ is determined as follows.

$T^A_{mn} = T_{mn} U^0_{mn} \geq A$, $T^A_{mn} = 0$ otherwise.

"A" denotes a threshold that is experimentally determined.

A matrix $Q^A$, having an mn component as given below, is defined, and used as the common co-occurrence matrix.

$Q^A_{mn} = \log(T^A_{mn}) T^A_{mn} > 1$, $Q^A_{mn} = 0$ otherwise.

When hierarchical clustering is being conducted, $U^0_{mn}$ is set at zero when the value of $U^0_{mn}$ exceeds a threshold.

In step 24, processor 130 extracts a seed document of a cluster and constructs an initial cluster by performing previously described steps 1 and 2. A document whose document commonality to any current clusters is less than a threshold is assumed to be the remaining document set. The remaining document set is a set of documents having a high possibility of not belonging to any current clusters. The common co-occurrence matrix $T^A$, $Q^A$, and the document frequency matrix U are calculated on the basis of (1) the input document set at the first iteration, and (2) the remaining document set at the second and subsequent iterations.

It is desirable for the seed document of a cluster to be the dominant document in the topic that the document describes. Because the dominant document in a document group of the most dominant topic in the remaining document set is assumed to have a high document commonality to the remaining document set, step 24 (1) determines the document commonality between each document in the remaining document set and the remaining document set, and (2) selects the documents having high document commonalities as candidates of the seed of the cluster. Let $S^P$ be a common co-occurrence matrix for an arbitrary document P. During step 24, the document commonality between document P and the remaining document set, is obtained as follows.

$$com_q(D', P; Q^A) = \frac{\sum_{m=1}^{M} \sum_{n=1}^{M} Q_{mn}^A S_{mn}^P}{\sqrt{\sum_{m=1}^{M} \sum_{n=1}^{M} (Q_{mn}^A)^2} \sqrt{\sum_{m=1}^{M} \sum_{n=1}^{M} (S_{mn}^P)^2}} \quad (2)$$

In equation (2), matrix $T^A$ can also be used instead of the matrix $Q^A$. To reduce the influence of terms common to plural topics, diagonal components of the co-occurrence matrix and the common co-occurrence matrix can not be used in equation (2) because individual terms tend to be shared in plural topics more easily than term pairs.

The candidates of the seed document of the cluster are obtained by calculating the document commonalities to all documents in the remaining document set by using equation (2), and selecting a specific number of documents having high document commonalities.

Next, the portion of step 24 dealing with cluster seed document extraction is described. For each candidate document, the similarities of all documents in the remaining document set D are initially obtained. The well known cosine similarity can be adopted as the similarity measure. Next, for each candidate document, documents having greater similarities than a preset threshold are obtained as neighbor documents of each candidate document. The document having the largest number of neighbor documents is selected from the candidate documents as the cluster seed document. The initial cluster is given by the neighbor documents of the seed document.

Figure 3:
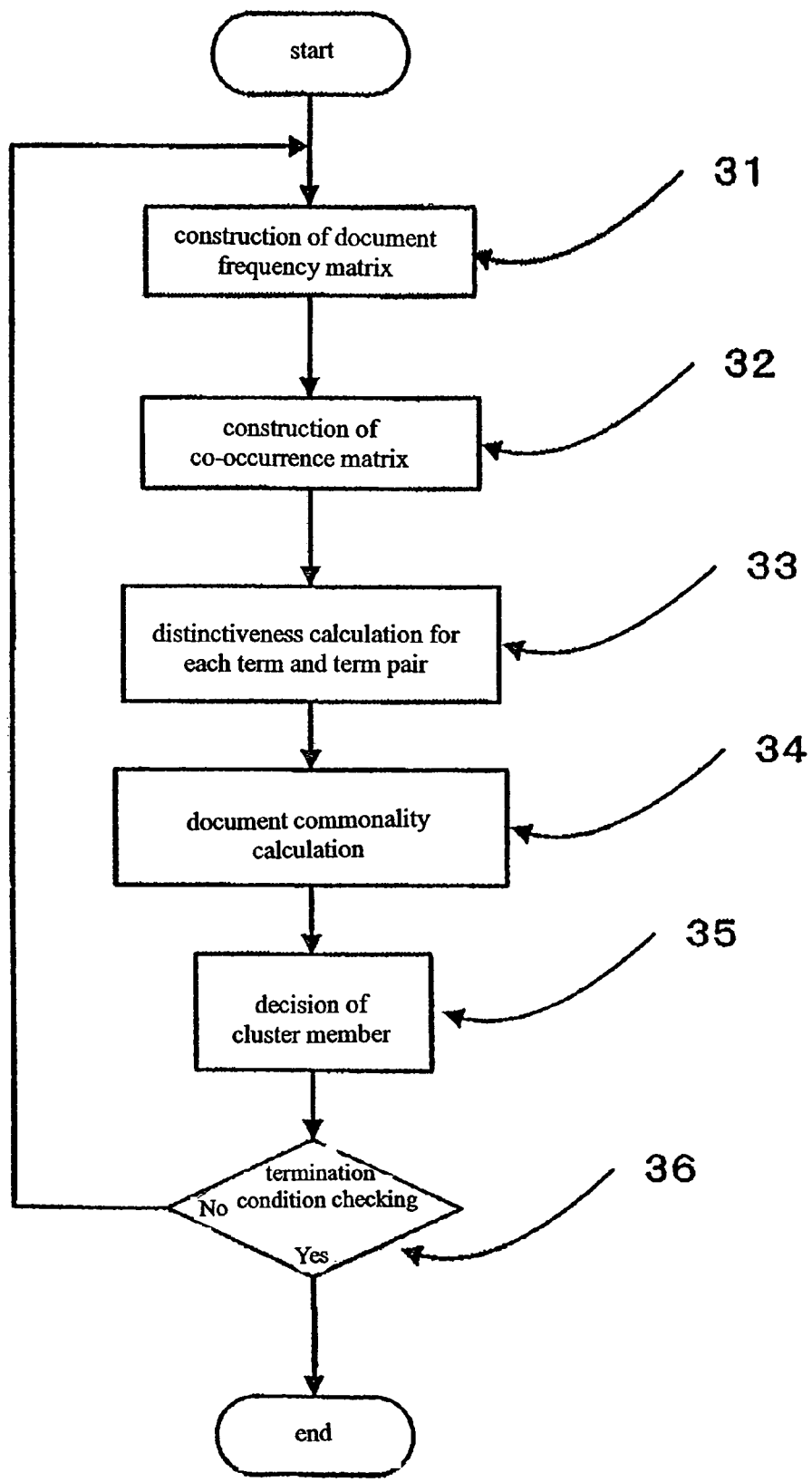
FIG. 3 is a flow diagram of how operatives associated with the document information processing block of FIG. 1 causes a cluster to grow, a procedure of growth from the initial cluster.

In cluster growing step 25 that block 130 performs, a cluster grows by merging documents having high commonalities to the cluster. FIG. 3 is a detailed flow diagram of the cluster growth step 25. Initially block 130 constructs document frequency matrix during step 31. Then block 130 constructs common co-occurrence matrix during step 32, that is followed by step 33 during which a distinctiveness calculation for each term and term pair is performed. Then, during step 34 block 130 calculates document commonality, followed by step 35 during which a cluster member decision is performed. Then block 130 advances to termination condition checking step 36.

During step 31, involving the construction of the document frequency matrix, and step 32, involving construction of the common co-occurrence matrix, block 130 performs processes during steps 31 and 32 on the currently processed set of documents. These processes of steps 31 and 32 are equivalent to the document frequency matrix construction process and the common co-occurrence matrix construction process during step 23 of FIG. 2.

Let U be the document frequency matrix obtained during step 31. Let $T^A$ and $Q^A$ respectively be the common co-occurrence matrix and its modified matrix, as obtained during step 32. During step 33, block 130 determines the distinctiveness and the weight for each term. The weight is set at zero for the term and term pair with zero document frequency. First, in the manner described before, $U^0_{mm}/U_{mm}$ is obtained as the document frequency ratio for the term m. In addition, a specific number of terms having high document frequencies and a specific number of terms having small document frequency ratios are selected. The selected terms are assumed to be distinctive terms of the given cluster. Next, the document frequency ratios of these terms are averaged. Let c' be the average document frequency ratio. Distinctiveness $v_{mm}$ of the term m, and distinctiveness $v_{mn}$ of the term pair m, n are determined by the following.

$$v_{mm} = c'/(U^0_{mm}/U_{mm})$$

$$v_{mn} = c'/(U^0_{mn}/U_{mn})$$

Alternatively, the average document frequency ratio can be obtained by using both the distinctive term pair and the distinctive term. In this case, $U^0_{mn}/U_{mn}$ is obtained as the document frequency ratio of the term pair m,n when m does not equal n, and is obtained as the document frequency ratio of the term m, when m equals n. Among a specific number of terms and term pairs having the highest document frequencies, a specific number of terms or term pairs having small document frequency ratios are selected. The selected terms or term pairs are regarded as the distinctive terms or term pairs of the given cluster. Next, the document frequency ratios of these terms and term pairs are averaged. Let c' be the average.

Let $z_{mm}$ and $z_{mn}$ be the weights of the term m and the term pair m,n, respectively. These weights are determined by using a weight deciding function f(x) as follows.

$$z_{mm} = f(v_{mm})$$

$$z_{mn} = f(v_{mn})$$

Many functions can be considered for f(x). For example, the following can be used.

$$f(x) = x,$$

or $$f(x) = x^2,$$

or $$f(x) = 1 \text{ if } x > \text{threshold},$$

$$f(x) = 0 \text{ otherwise}.$$

In the document commonality calculation step 34, block 130 calculates the document commonalities to the given cluster for all input documents. Let $S^P$ be the co-occurrence matrix of document P. The document commonality of the document P to document set D can be obtained by $$com_l(D, P; Q^A) = \frac{\sum_{m=1}^{M} z_{mm} Q_{mm}^A S_{mm}^P}{\sqrt{\sum_{m=1}^{M} z_{mm} (Q_{mm}^A)^2} \sqrt{\sum_{m=1}^{M} z_{mm} (S_{mm}^P)^2}},$$

or $$com_q(D, P; Q^A) = \frac{\sum_{m=1}^{M} \sum_{n=1}^{M} z_{mn} Q_{mn}^A S_{mn}^P}{\sqrt{\sum_{m=1}^{M} \sum_{n=1}^{M} z_{mn} (Q_{mn}^A)^2} \sqrt{\sum_{m=1}^{M} \sum_{n=1}^{M} z_{mn} (S_{mn}^P)^2}},$$

where D represents a document set of the given cluster. In the above equations, matrix $T^A$ can be used instead of matrix $Q^A$.

In step 35 block 130 determines the temporal members of the given cluster by selecting the documents having higher document commonalities than a specific value.

In termination condition checking step 36, block 130 determines whether or not the growing processing of the given cluster is complete. At the first iteration of step 36, processing unconditionally returns to step 31 and the processing of step 31 is repeated. At the second or subsequent iteration of step 36, the number of documents in the given cluster obtained during step 35 is counted. If the number of documents is not equal to that in the former iteration, the procedure returns to step 31 and the processing of step 31 is repeated. If the number of documents is determined during step 36 to be equal to that in the former iteration, the document commonalities of the given cluster are kept for all input documents, and the growing processing of the given cluster is terminated.

The description of FIG. 2 now continues.

During step 26, block 13 extracts the remaining documents on the basis of the document commonality of each document to all current clusters. Documents whose document commonalities to any clusters are less than a threshold are extracted as remaining documents.

During the termination condition checking step 27, block 140 determines whether or not a series of processings from the seed extraction to the growing has been completed on the basis of the number of remaining documents. If the number of remaining documents is less than a threshold and is equal to the number of remaining documents in the former iteration, the procedure proceeds to step 29. If such a condition is not satisfied, the process proceeds to step 28 and processing equivalent to step 23 is performed on the remaining document set.

In step 29 of the decision of the cluster member, the cluster that each document belongs to is determined. This can be carried out by using the information about the document commonality to each cluster obtained for each document in FIG. 3 and by making each document belong to the cluster to which the document commonality is higher than a threshold determined by experiments.

During step 30, involving detection and removal of redundant clusters, block 130 determines whether or not a redundant cluster exists. If a redundant cluster exists, it is removed. A redundant cluster occurs when two or more clusters are obtained for one topic. In such a case, the document describing the topic has large document commonalities to two or more clusters, and the two or more clusters overlap with each other. To detect the redundant clusters, the document commonalities to all obtained clusters are first obtained for all documents.

Next, the number of documents whose document commonalities to a given cluster are larger than a threshold and whose document commonalities to any other cluster are less than the threshold is obtained. If the given cluster does not overlap with any other clusters, the number of such documents becomes equal to the number of documents having a higher number of document commonalities than the threshold to the given cluster. On the other hand, if the given cluster overlaps with another cluster, the number of documents in the cluster becomes the number of documents that does not overlap with the cluster, that is, the number of documents in only the given cluster.

Figure 4A:
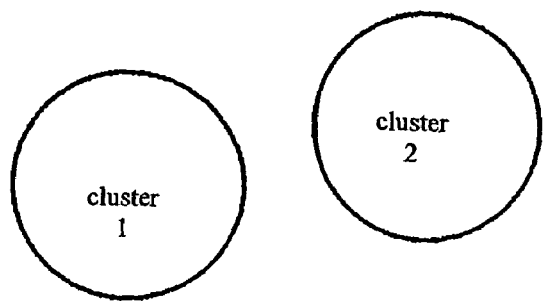
FIGS. 4A and 4B are diagrams helpful in explaining the method of deleting a redundant cluster.
Figure 4B:
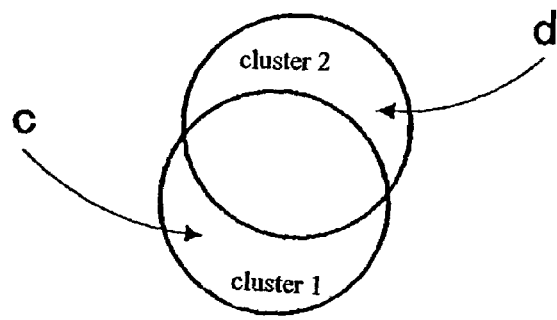

The number of documents as stated above can be defined as the importance of each cluster. In the case of FIG. 4A, for example, the importance of cluster 1 is the number of documents in cluster 1. This is the case for cluster 2. If the given cluster partially overlaps with the other cluster, the importance becomes the number of documents not overlapping with the other cluster. That is, with respect to cluster 1, the importance is represented by the number of documents contained in a portion indicated by "c" in FIG. 4B. With respect to cluster 2, the importance is represented by the number of documents contained in a portion shown by "d" in FIG. 4B.

If the importance of one cluster is smaller than a specific value, even if the number of documents belonging to the cluster is large, the cluster with the smaller importance is regarded as the redundant cluster and is removed. If a plurality of such smaller importance clusters exist, the cluster having the lowest cluster importance is first removed. Calculation of cluster importance is then performed again on the remaining clusters, and the cluster having the lowest cluster importance is removed. Processing in this manner is repeated until no redundant clusters exist. If redundant cluster removal is performed, the determination of each cluster member is performed again. In this case, assignment of each document to the cluster to which the document commonality is the highest is an alternative method of cluster member decision.

To explain the effect of the preceding operation, experimental results based on the embodiment of FIGS. 2 and 3 are described. TDT2 is used as the corpus. Corpus TDT2 is a set of news stories relating to 100 events between January and June of 1998 and is gathered from six news sources. A comparison is made with the results of non-hierarchical clustering performed using TDT2 by Liu et al. (X. Liu, Y. Gong, W. Xu and S. Zhu, Document Clustering with Cluster Refinement and Model Selection Capabilities. In Proceedings of the 25$^{th}$ Annual International ACM-SIGIR Conference on Research and Development in Information Retrieval, pp. 191-198. Tampere, Finland, August, 2002). The composition is based on experimental results using the same data as the Lie et al. experiments.

The data are a set of news stories relating to 15 events gathered by ABC, CNN and VOA. Table 1 includes the details of those data.

TABLE 1

| Event | | Number of Documents | | | |
|---|---|---|---|---|---|
| ID | Content of Each Event | ABC | CNN | VOA | Total |
| 01 | Asian Economic Crisis | 27 | 90 | 289 | 406 |
| 02 | Monica Lewinsky Case | 102 | 497 | 96 | 695 |
| 13 | 1998 Winter Olympic | 21 | 81 | 108 | 210 |
| 15 | Current Conflict with Iraq | 77 | 438 | 345 | 860 |
| 18 | Bombing AL Clinic | 9 | 73 | 5 | 87 |
| 23 | Violence in Algeria | 1 | 1 | 60 | 62 |
| 32 | Sgt. Gene McKinney | 6 | 91 | 3 | 100 |

TABLE 1-continued

| Event ID | Content of Each Event | Number of Documents | | | |
|---|---|---|---|---|---|
| | | ABC | CNN | VOA | Total |
| 39 | India Parliamentary Election | 1 | 1 | 29 | 31 |
| 44 | National Tobacco Settlement | 26 | 163 | 17 | 206 |
| 48 | Jonesboro Shooting | 13 | 73 | 15 | 101 |
| 70 | India, A Nuclear Power? | 24 | 98 | 129 | 251 |
| 71 | Israeli-Palestinian Talks | 5 | 62 | 48 | 115 |
| 76 | Anti-Suharto Violence | 13 | 55 | 114 | 182 |
| 77 | Unabomer | 9 | 66 | 6 | 81 |
| 86 | Strike | 14 | 83 | 24 | 121 |

Table 2 includes 15 data sets used in the experiment, and the clustering accuracies of the methods disclosed herein and by Liu et al. The results of the method of Liu et al. are based on the Liu et al. paper. When the event to which a certain document belongs coincides with the event of the seed document of the cluster, the result of the clustering is regarded as correct. A document whose document commonality to all clusters is 0 is regarded as erroneous. The accuracy is obtained from the ratio of the number of correctly clustered documents to the number of all documents. In the Liu et al. method, after non-hierarchical clustering is performed on the basis of a Gaussian mixture model, distinctive terms of each cluster are obtained, and the result is corrected by voting of the distinctive terms. In Table 2, ABC-01-02-15 of the test data means documents gathered from ABC and having event IDs in table 1 of 01, 02 and 15. From Table 2, the number of data sets having high accuracy in the method disclosed herein is larger than in the Liu et al. method.

TABLE 2

| Number | Data Set | Method of Liu et al. | Method disclosed herein |
|---|---|---|---|
| 1 | ABC-01-02-15 | 1.0000 | 0.9806 |
| 2 | ABC-02-15-44 | 0.9902 | 0.9805 |
| 3 | ABC-01-13-44-70 | 1.0000 | 1.0000 |
| 4 | ABC-01-44-48-70 | 1.0000 | 1.0000 |
| 5 | CNN-01-02-15 | 0.9756 | 0.9932 |
| 6 | CNN-02-15-44 | 0.9964 | 0.9964 |
| 7 | VOA-01-02-15 | 0.9896 | 0.9986 |
| 8 | VOA-01-13-76 | 0.9583 | 0.8943 |
| 9 | VOA-01-23-70-76 | 0.9453 | 0.9206 |
| 10 | VOA-12-39-48-71 | 0.9898 | 1.0000 |
| 11 | VOA-44-48-70-71-76-77-86 | 0.8527 | 1.0000 |
| 12 | ABC + CNN-01-13-18-32-48-70-71-77-86 | 0.9704 | 0.9917 |
| 13 | CNN + VOA-01-13-48-70-71-76-77-86 | 0.9262 | 0.9500 |
| 14 | ABC + CNN + VOA-44-48-70-71-76-77-86 | 0.9938 | 1.0000 |

With respect to the 12 data sets listed in the Liu et al. paper, the number of extracted clusters was correct in the method disclosed herein. On the other hand, in the method of Liu et al., the number of extracted clusters was incorrect for three data sets among the 12 data sets. Table 3 includes the results of the method of Liu et al. and the method disclosed herein.

TABLE 3

| Test Data | Number of Clusters To Be Obtained | Testing Results by Liu et al. | Testing Results by Method Disclosed Herein |
|---|---|---|---|
| ABC-01-03 | 2 | 2 | 2 |
| ABC-01-02-15 | 3 | 3 | 3 |
| ABC-02-48-70 | 3 | 2 | 3 |

TABLE 3-continued

| Test Data | Number of Clusters To Be Obtained | Testing Results by Liu et al. | Testing Results by Method Disclosed Herein |
|---|---|---|---|
| ABC-44-70-01-13 | 4 | 4 | 4 |
| ABC-44-48-70-76 | 4 | 4 | 4 |
| CNN-01-02-15 | 3 | 4 | 3 |
| CNN-01-02-13-15-18 | 5 | 5 | 5 |
| CNN-44-48-70-71-76-77 | 6 | 5 | 6 |
| VOA-01-02-15 | 3 | 3 | 3 |
| VOA-01-13-76 | 3 | 3 | 3 |
| VOA-01-23-70-76 | 4 | 4 | 4 |
| VOA-12-39-48-71 | 4 | 4 | 4 |

As described above, according to the method disclosed herein, the correct number of clusters can be extracted from an input document set, and each document can be assigned to a cluster with high accuracy. Therefore, the efficiency of information acquisition by the user can be significantly improved.

The above embodiments are described by taking a document set as an example. Further, the disclosed embodiments can be applied to a pattern set, which can be similarly represented and has the same characteristic as the document set described herein. Replacing a document with a pattern involves replacing (1) terms of a document with constituents of a pattern, (2) a document segment with a pattern segment, (3) a document frequency matrix with a pattern frequency matrix, (4) a co-occurrence matrix for each document with a co-occurrence matrix for each pattern, (5) a document commonality with a pattern commonality etc. As a result, principles of the present invention can be applied to a pattern set as well as a document set. In the claims, the terminology (or pattern), (or object feature), is used to designate operations associated with patterns, instead of documents.

What is claimed is:

1. A computer implemented method of clustering documents, each clustering document having one or plural document segments in an input document, said method comprising steps:
    (a) obtaining a co-occurrence matrix for the input document by using a computer, the co-occurrence matrix is a matrix reflecting occurrence frequencies of terms and co-occurrence frequencies of term pairs, and obtaining an input document frequency matrix for a set of input documents based on occurrence frequencies of terms or term pairs appearing in the set of input documents wherein said step (a) further includes:
    generating an input document segment vector for each input document segment of said input document segments based on occurrence frequencies of terms appearing in said each input document segment;
    obtaining the co-occurrence matrix for the input document from input document segment vectors; and
    obtaining the input document frequency matrix from the co-occurrence matrix for each document;
    (b) selecting a seed document from a set of remaining documents that are not included in any cluster existing, and constructing a current cluster of an initial state based on the seed document, wherein said selecting and said constructing comprises:
    constructing a remaining document common co-occurrence matrix for the set of the remaining documents based on a product of corresponding components of co-occurrence matrices of all documents in the set of remaining documents; and obtaining a document commonality of each remaining document to the set of the remaining documents based on a product sum between every component of the co-occurrence matrix of each remaining document and the corresponding component of the remaining document common co-occurrence matrix;

extracting a document having highest document commonality to the set of the remaining documents; and constructing initial cluster by including the seed document and neighbor documents similar to the seed document;

(c) making documents, which have document commonality to a current cluster higher than a threshold, belong temporarily to the current cluster; wherein said making comprising:

constructing a current cluster common co-occurrence matrix for the current cluster and a current cluster document frequency matrix of the current cluster based on occurrence frequencies of terms or term pairs appearing in the documents of the current cluster;

obtaining a distinctiveness value of each term and each term pair for the current cluster by comparing the input document frequency matrix with the current cluster document frequency matrix;

obtaining weights of each term and each term pair from the distinctiveness values;

obtaining a document commonality to the current cluster for each document in a input document set based on a product sum between every component of the co-occurrence matrix of the input document and the corresponding component of the current cluster common co-occurrence matrix while applying the weights to said components; and making the documents having document commonality to the current cluster higher than the threshold belong temporarily to the current cluster;

(d) repeating step (c) until number of documents temporarily belonging to the current cluster does not increase;

(e) repeating steps (b) through (d) until a given convergence condition is satisfied; and (f) deciding, on a basis of the document commonality of each document to each cluster, a cluster to which each document belongs and outputting said cluster.

2. The method according to claim 1, wherein the remaining document common co-occurrence matrix or the current cluster common co-occurrence matrix reflects co-occurrence frequencies at which pairs of different terms co-occur in each document of the remaining documents or the current cluster.

3. The clustering method according to claim 1, wherein the convergence condition in said step (e) is satisfied when (i) the number of documents whose document commonalities to any current clusters are less than a threshold becomes 0, or (ii) the number is less than a threshold and does not increase.

4. The clustering method according to claim 1, wherein said step (f) further includes: checking existence of a redundant cluster, and removing, when the redundant cluster exists, the redundant cluster and again deciding the cluster to which each document belongs.

5. A computer implemented method of clustering documents each having one or plural document segments in an input document, said method comprising steps:

(a) using a computer to obtain a co-occurrence matrix for the input document, obtaining a co-occurrence matrix $S^r$ for a input document $D_r$ based on occurrence frequencies of terms or term pairs appearing in the set of input documents;

wherein in step (a), each mn component $S^r_{mn}$ of the co-occurrence matrix $S^r$ of the document $D_r$ is determined in accordance with:

$$S^r_{mn} = \sum_{y=1}^{Y_r} d_{rym} d_{ryn}$$

where:

m and n denote $m^{th}$ and $n^{th}$ terms, respectively, among M terms appearing in the set of input documents, $D_r$ is $r^{th}$ document in a document set D consisting of R documents;

$Y_r$ is number of document segments in the document $D_r$, wherein said $d_{rym}$ and $d_{ryn}$ denote existence or absence of the $m^{th}$ and $n^{th}$ terms, respectively, in $y^{th}$ document segment of the document $D_r$, and $S^r_{mm}$ represents number of document segments in which the $m^{th}$ term occurs and $S^r_{mm}$ represents co-occurrence counts of document segments in which the $m^{th}$ and $n^{th}$ terms co-occur;

(b) selecting a seed document from a set of remaining documents that are not included in any cluster existing, and constructing a current cluster of an initial state based on the seed document, wherein said selecting and said constructing comprise:

constructing a remaining document common co-occurrence matrix $T^A$ for a set of the remaining documents based on co-occurrence matrices of all documents in the set of remaining documents;

obtaining a document commonality of each remaining document to the set of the remaining documents based on the co-occurrence matrix $S^r$ of each remaining document and the remaining document common co-occurrence matrix $T^A$;

extracting the document having a highest document commonality to the set of the remaining documents; and constructing a initial cluster by including the seed document and neighbor documents similar to the seed document;

(c) making documents having document commonality higher than a threshold belong temporarily to the current cluster;

(d) repeating step (c) until a number of documents temporarily belonging to the current cluster does not increase;

(e) repeating steps (b) through (d) until a given convergence condition is satisfied; and (f) deciding, on basis of the document commonality of each document to each cluster, a cluster to which each document belongs and outputting said cluster.

6. The method according to claim 5, wherein in step (b), the remaining document common co-occurrence matrix $T^A$ is determined on the basis of a matrix T;

wherein the matrix T has an mn component determined by $$T_{mn} = \prod_{r=1}^{R} S^r_{mn}$$

and $S^r_{mn} > 0$ the matrix $T^A$ has an mn component determined by $T^A_{mn} = T_{mn}$ when $U_{mn} > A$, $T^A_{mn} = 0$ otherwise, where $U_{mn}$ represents an mn component of a document frequency matrix of the set of remaining documents wherein $U_{mm}$ denotes the number of remaining documents in which the $m^{th}$ term occurs and $U_{mn}$ denotes the number of remaining documents in which the $m^{th}$ and $n^{th}$ terms co-occur; and A denotes a predetermined threshold.

7. The method according to claim 6, further comprising:
determining a modified common co-occurrence matrix $Q^A$ on the basis of $T^A$; and in step (b), obtaining the document commonality of each remaining document to the set of the remaining documents based on the co-occurrence matrix Sr of each remaining document and the modified common co-occurrence matrix $Q^A$;

the matrix $Q^A$ having an mn component determined by $Q^A_{mn} = \log T^A_{mn}$ when $T^A_{mn} > 1$, $Q^A_{mn} = 0$ otherwise.

8. The method according to claim 7, wherein in step (b), the document commonality of each remaining document P having a co-occurrence matrix $S^P$ with respect to the set of remaining documents is given by $$com_q(D', P; Q^A) = \frac{\sum_{m=1}^{M}\sum_{n=1}^{M} Q^A_{mn} S^P_{mn}}{\sqrt{\sum_{m=1}^{M}\sum_{n=1}^{M} (Q^A_{mn})^2} \sqrt{\sum_{m=1}^{M}\sum_{n=1}^{M} (S^P_{mn})^2}}.$$

9. The method according to claim 7, wherein in step (b), the document commonality of each remaining document P having a co-occurrence matrix $S^P$ with respect to the set of remaining documents is given by $$com_q(D', P; Q^A) = \frac{\sum_{m=1}^{M}\sum_{n=1}^{M} T^A_{mn} S^P_{mn}}{\sqrt{\sum_{m=1}^{M}\sum_{n=1}^{M} (T^A_{mn})^2} \sqrt{\sum_{m=1}^{M}\sum_{n=1}^{M} (S^P_{mn})^2}}.$$

* * * * *